United States Patent
Ramsey

(10) Patent No.: US 7,198,298 B2
(45) Date of Patent: Apr. 3, 2007

(54) MOVABLE SUBFRAME FOR SEMI-TRAILERS

(75) Inventor: John Edward Ramsey, Canton, OH (US)

(73) Assignee: Hendrickson USA, L L C, Canton, OH (US)

( * ) Notice: Subject to any disclaimer, the term of this patent is extended or adjusted under 35 U.S.C. 154(b) by 0 days.

(21) Appl. No.: 10/686,169

(22) Filed: Oct. 15, 2003

(65) Prior Publication Data

US 2005/0082814 A1    Apr. 21, 2005

(51) Int. Cl.
 *B62D 21/06* (2006.01)
(52) U.S. Cl. ..................................... 280/793
(58) Field of Classification Search ............... 280/793, 280/794, 788, 781, 800, 149.2; 180/312; 296/204
See application file for complete search history.

(56) References Cited

U.S. PATENT DOCUMENTS

| | | | | |
|---|---|---|---|---|
| 4,919,445 | A * | 4/1990 | Robey ...................... | 280/149.2 |
| 5,393,096 | A * | 2/1995 | Pierce et al. ................ | 280/788 |
| 5,720,489 | A | 2/1998 | Pierce et al. | |
| 5,860,668 | A * | 1/1999 | Hull et al. .................. | 280/408 |
| 6,213,507 | B1 * | 4/2001 | Ramsey et al. ............. | 280/788 |
| 6,425,593 | B2 * | 7/2002 | Fabris et al. ................ | 280/104 |
| 6,712,393 | B2 * | 3/2004 | Philipps ..................... | 280/794 |
| 2005/0051991 | A1 * | 3/2005 | Saxon et al. ............. | 280/149.2 |

OTHER PUBLICATIONS

Reyco Granning, 19AR, Tradeshow Advertising Material, Mar. 2000.
Reyco Granning, Class 40, Tradeshow Advertising Material, Mar. 2001.
Manac Platform Trailer Primary Suspension Bracing, May 17, 2000.
Reinke Mfg. Platform Trailer Primary Suspension Bracing, Jul. 2000.
Manac Aluminum Frame Platform Trailer Primary Suspension Bracing, Sep. 2000.

* cited by examiner

*Primary Examiner*—Faye M. Fleming
(74) *Attorney, Agent, or Firm*—Buckingham Doolittle & Burroughs, LLP.; David P. Dureska; Brent L. Moore

(57) ABSTRACT

A movable subframe or slider for semi-trailers includes a pair of spaced-apart, parallel and longitudinally extending main members. The main members are interconnected by a pair of longitudinally spaced, parallel and transversely extending horizontal cross members, a horizontally-disposed cross-brace structure, and a pair of longitudinally-spaced, parallel and vertically-disposed cross-brace structures. One or more axle/suspension systems are suspended from hangers which are mounted on and depend from the slider structure, and a retractable pin mechanism enables selective positioning of the slider relative to the trailer body for optimum load distribution and trailer versatility during vehicle operation. The integral slider structure supports the one or more axle/suspension systems, so that concentrated loads imposed on the slider via the axle/suspension systems during operation of the vehicle generally are dissipated throughout the entire slider structure.

17 Claims, 11 Drawing Sheets

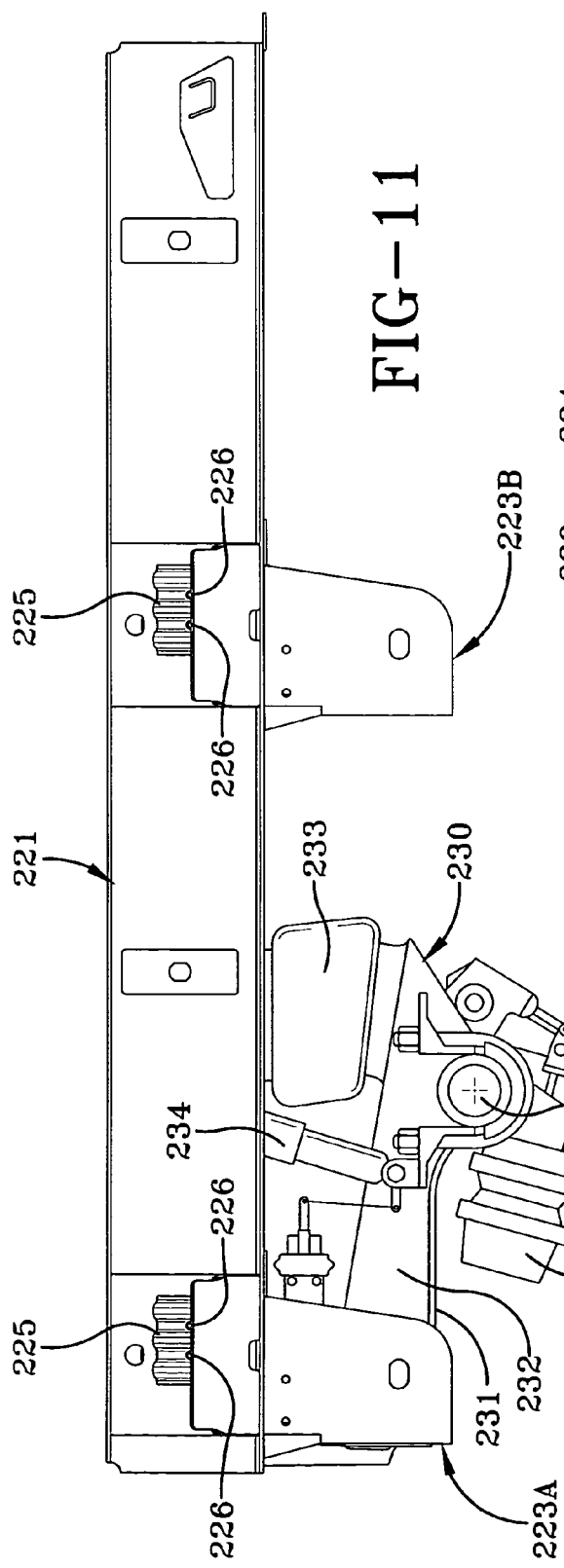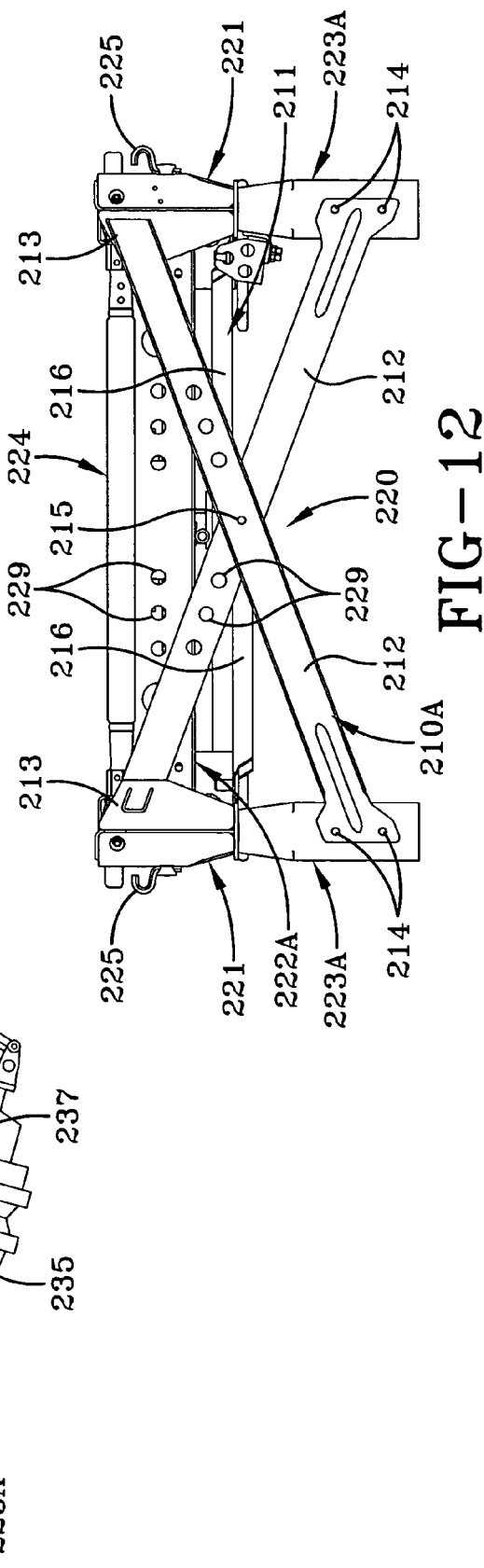

MOVABLE SUBFRAME FOR SEMI-TRAILERS

BACKGROUND OF THE INVENTION

1. Technical Field

The invention relates to semi-trailer subframes, and in particular to movable subframes for semi-trailers. More particularly, the invention is directed to a movable subframe for semi-trailers, which includes one or more generally X-shaped or cross-shaped structures that replace one or more of the transversely extending parallel cross members of conventional subframes, or alternatively replace the heretofore state-of-the-art transversely extending K-shaped structures, for more securely supporting one or more axle/suspension systems suspended from the subframe and to more efficiently react loads imposed on the subframe during operation of the vehicle, while reducing the overall weight and possibly the cost of the subframe.

2. Background Art

Movable subframes or secondary frames, typically referred to as sliders in the trucking industry, have been utilized on tractor-trailers or semi-trailers for many years. One or more axle/suspension systems usually are suspended from a single slider structure. The slider in turn is mounted on the underside of the trailer body or primary frame, and is movable longitudinally therealong to increase maneuverability and provide a means of variable load distribution. Once properly positioned, the slider is locked in place on the underside of the trailer, usually by a retractable pin mechanism.

Conventional or prior art slider designs were developed before the advent of air suspension systems for trailers. At that time, spring suspension systems were the suspension of choice for trailers. However, the spring suspension system resulted in a relatively rough ride to the cargo and did not equalize in all situations, thus creating the need for a slider with soft ride characteristics and efficient equalization characteristics. The development of the slider resulted in good variable load distribution for trailers, which enabled trailers to be more versatile.

Moreover, the subsequent development of air suspension systems provided load equalization among multiple axles for semi-trailers, with or without the utilization of sliders, as well as improved ride quality for individual axles. Of course, the combination of a movable slider and an air suspension system provided maximum versatility with respect to variable load distribution and load equalization in a trailer. Unfortunately, prior art sliders equipped with air suspensions added unwanted weight to the trailer, primarily because those sliders were originally built to support spring suspensions and adapting them to incorporate air suspensions required additional bracing and support.

Also, vehicles containing more than one non-steerable axle, including semi-trailers, are subject to lateral or side loads. Lateral loads can act through the slider in opposite directions, and the affect of such twisting torsional loads on the slider can be significant. Moreover, a slider is subjected to strong vertical and longitudinal loads. A durable slider design must effectively react such loads. Conventional prior art slider designs control vertical loads by utilizing rigid, and therefore heavy, main members and cross members. However, such a rigid structure fails to minimize the effect of lateral and longitudinal loads on the slider structure.

The current state-of-the-art slider design in the semi-trailer industry is the "K-frame slider," which is the subject of U.S. Pat. No. 5,720,489, dated Feb. 24, 1998, to Pierce et al., which is assigned to the Boler Company, the assignee of the instant application. This invention replaced at least four of the cross members of conventional prior art sliders with four shorter and lighter diagonal or inclined members, which when combined with the remaining pair of cross members resulted in a pair of K-shaped structures. These transversely extending K-shaped structures improved the ability of the slider to react lateral, longitudinal and vertical loads, while also reducing weight and cost.

While the K-frame slider was an improvement over conventional prior art sliders solely utilizing a plurality of transversely extending parallel cross members, the present invention solves certain problems associated with the K-frame slider and thus is an improvement over both prior art K-frame and conventional sliders. More particularly, the present invention more efficiently reacts the load vectors emanating from side or lateral loads and racking loads by locating cross-braces generally at the locations where those vectors occur. In contrast, the K-frame slider, while performing satisfactorily in most cases, locates its K-shaped structures remote from those particular load vectors, so that certain unwanted deflections and stress risers still occur resulting in less than optimum integrity of the slider secondary frame structure. Thus, the present invention is stronger, reacts loads more efficiently, is less costly to manufacture, and is lighter than prior art conventional and K-frame slider designs.

SUMMARY OF THE INVENTION

The objectives of the present invention include providing a slider for semi-trailers having significantly reduced weight than that found in prior art sliders, yet having improved strength and capability for withstanding vertical, longitudinal, roll, and especially side or lateral and racking loads.

Another objective of the present invention is to provide such a slider for semi-trailers which can be more efficiently manufactured than prior art sliders.

These objectives and advantages are obtained by the frame structure for a vehicle trailer of the present invention, the frame structure including, a pair of spaced-apart, parallel elongated and longitudinally extending main members, a pair of spaced-apart, parallel transverse cross members extending between and being attached to the main members, a horizontally disposed brace structure extending between and being attached to the main members, and at least one vertically disposed brace structure extending between and being attached to the main members and the hangers.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 11 is an elevational view of the slider shown in FIGS. 9 and 10, but showing one of the axle/suspension systems;

FIG. 12 is a front end view of the slider shown in FIGS. 9 and 10; and

Similar numerals refer to similar parts throughout the drawings.

DESCRIPTION OF THE PREFERRED EMBODIMENT

So that the improved slider of the present invention can be best understood, a pair of prior art sliders will be described first.

Figure 1:
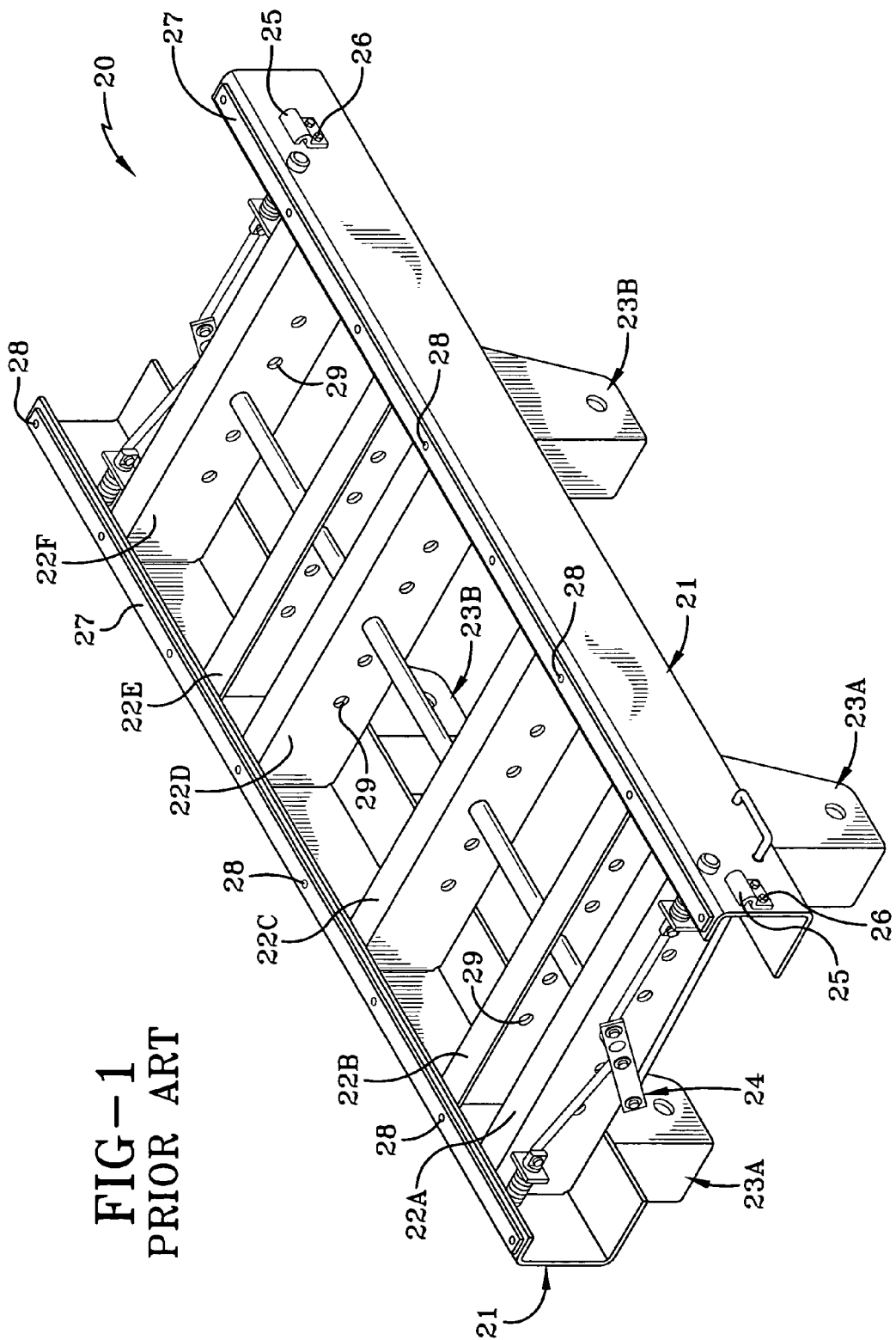
FIG. 1 is a perspective view of a conventional prior art slider for a semi-trailer having a plurality of transversely extending parallel cross members, showing the retractable pin mechanism used to selectively locate the slider along the underside of a trailer, and further showing depending hangers for suspending axle/suspension systems.

A prior art slider for a semi-trailer is indicated generally at 20 and is shown in FIG. 1. Slider 20 includes a pair of main members 21, a plurality of cross members 22A through F, front and rear pairs of hangers 23A and 23B, respectively, for suspending axle/suspension systems, and a retractable pin mechanism 24.

Specifically, each main member 21 is an elongated, generally C-shaped beam made of a metal such as steel or other suitable robust material, and the other components of slider 20, including hangers 23 and pin mechanism 24 are formed of a similar robust material unless otherwise noted. The open portion of each main member 21 is opposed to the open portion of the other main member and faces inboard relative to slider 20. Main members 21 are connected to each other in spaced-apart parallel relationship by cross members 22A–F, which extend between and are perpendicular to main members 21. Each end of each cross member 22 nests in the open portion of a respective one of main members 21, and is secured therein by any suitable means such as welding or mechanical fastening. Each cross member 22 is a generally C-shaped beam made of a metal such as steel or other suitable material, and has a plurality of openings 29 formed in its vertically extending surface. Openings 29 are aligned with corresponding openings formed in the other cross members 22 to provide for passage of air and/or fluid conduits, electrical lines, and the like used in the operation of the semi-trailer (not shown). Each front hanger 23A is attached by welding or other suitable means, to the lowermost surface of a respective one of main members 21 at a location directly beneath cross members 22A, B. Each rear hanger 23B similarly is attached at a location directly beneath cross members 22D, E.

Each main member 21 has a pair of rail guides 25 mounted on its outboard surface by bolts 26. Each rail guide 25 is mounted adjacent to a respective one of the front and rear ends of main member 21. A low friction strip 27 is attached to the uppermost surface of each main member 21 by recessed fasteners 28, and extends generally the entire length of main member 21. Strip 27 is formed of any suitable low friction material, such as ultra-high molecular weight polyethylene.

Figure 2:
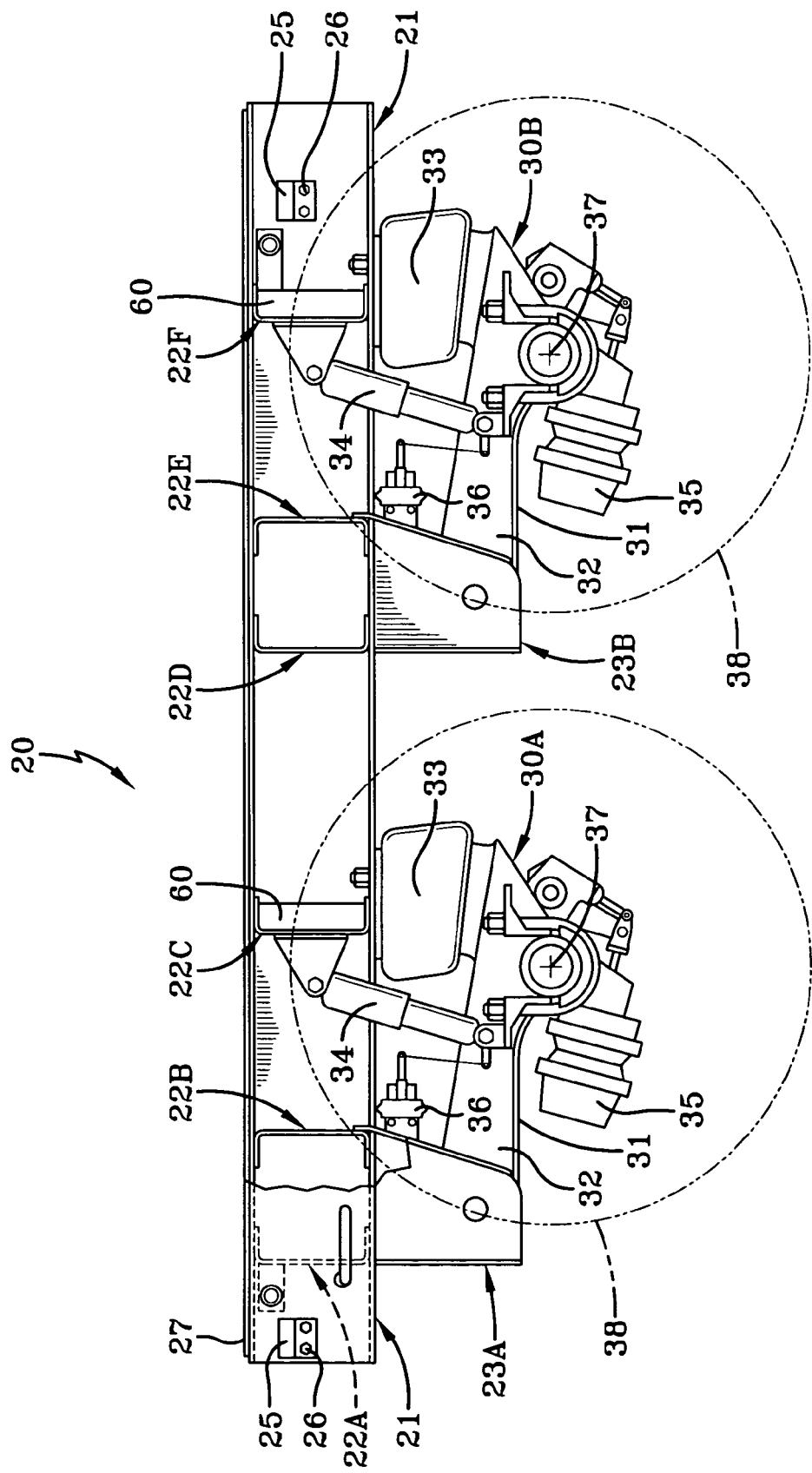
FIG. 2 is a fragmentary elevational view of the prior art slider illustrated in FIG. 1, but showing the axle/suspension systems, with the wheels/tires and hidden parts represented by broken lines.
Figure 3:
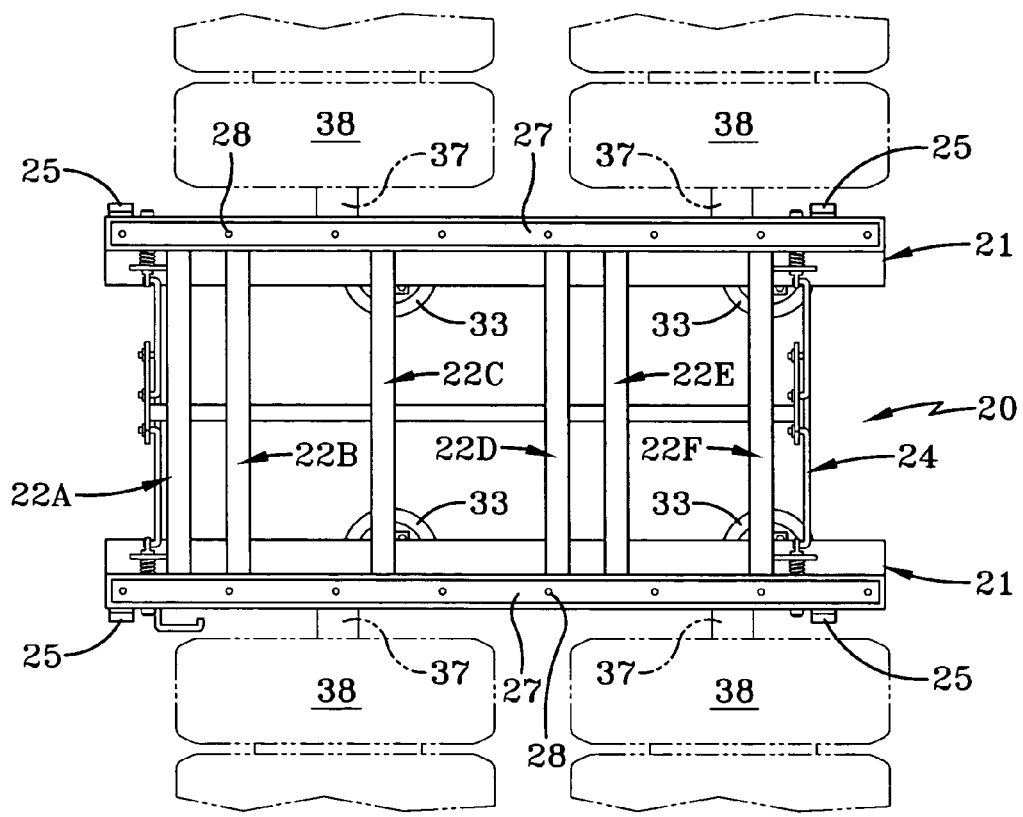
FIG. 3 is a reduced-size fragmentary top plan view of the prior art slider shown in FIG. 2.

As mentioned hereinabove, and as best shown in FIGS. 2 and 3, prior art slider 20 supports front and rear axle/suspension systems 30A and 30B, respectively. Inasmuch as each axle/suspension system 30A, B is suspended from slider 20, but does not form an integral part thereof, only the major components of system 30 will be cited for aiding in the description of the environment in which the prior art slider operates. Each axle/suspension system 30A, B includes generally identical suspension assemblies 31 suspended from each one of the pair of hangers 23A, B, respectively. Each suspension assembly 31 includes a suspension beam 32 which is pivotally mounted on hanger 23 in a usual manner. An air spring 33 is suitably mounted on and extends between the upper surface of the rearwardmost end of suspension beam 32 and main member 21 at a location directly beneath a certain one of the cross members 22C, F. A shock absorber 34 extends between and is mounted on suspension beam 32 and the certain cross member 22. One or more reinforcement struts 60 is strategically attached within each cross member 22C, F to strengthen the cross member for supporting suspension assemblies 31. Other components of suspension assembly 31, mentioned herein only for the sake of relative completeness, include an air brake 35 and a height control valve 36. An axle 37 extends between and is captured in the pair of suspension beams 32 of each axle/suspension system 30A, B. Wheels/tires 38 are mounted on each end of axle 37.

Figure 4:
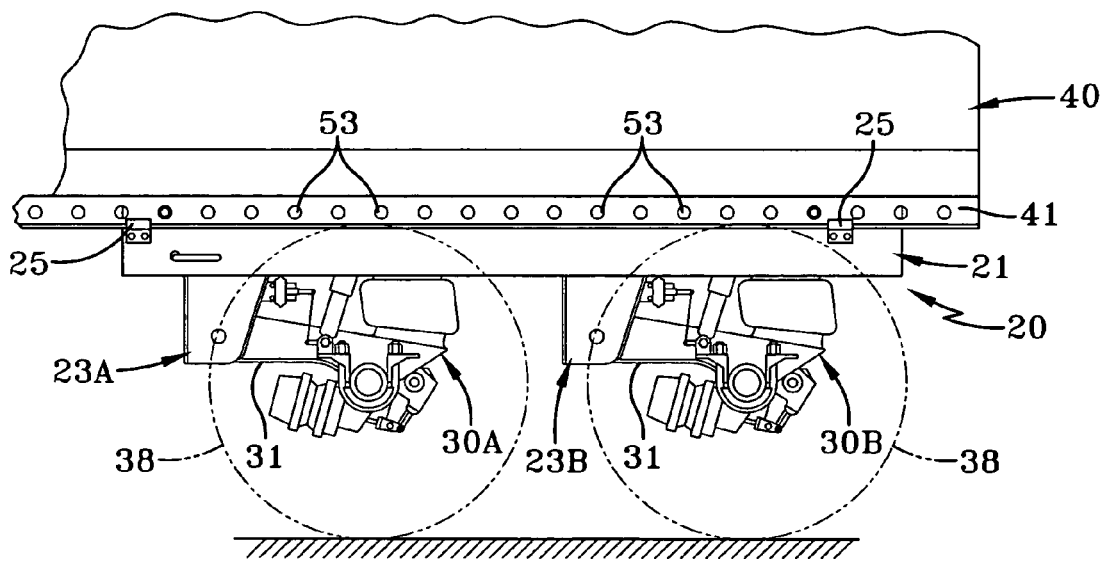
FIG. 4 is a fragmentary elevational view, showing the prior art slider of FIG. 3 movably mounted on the underside of a trailer body.
Figure 5:
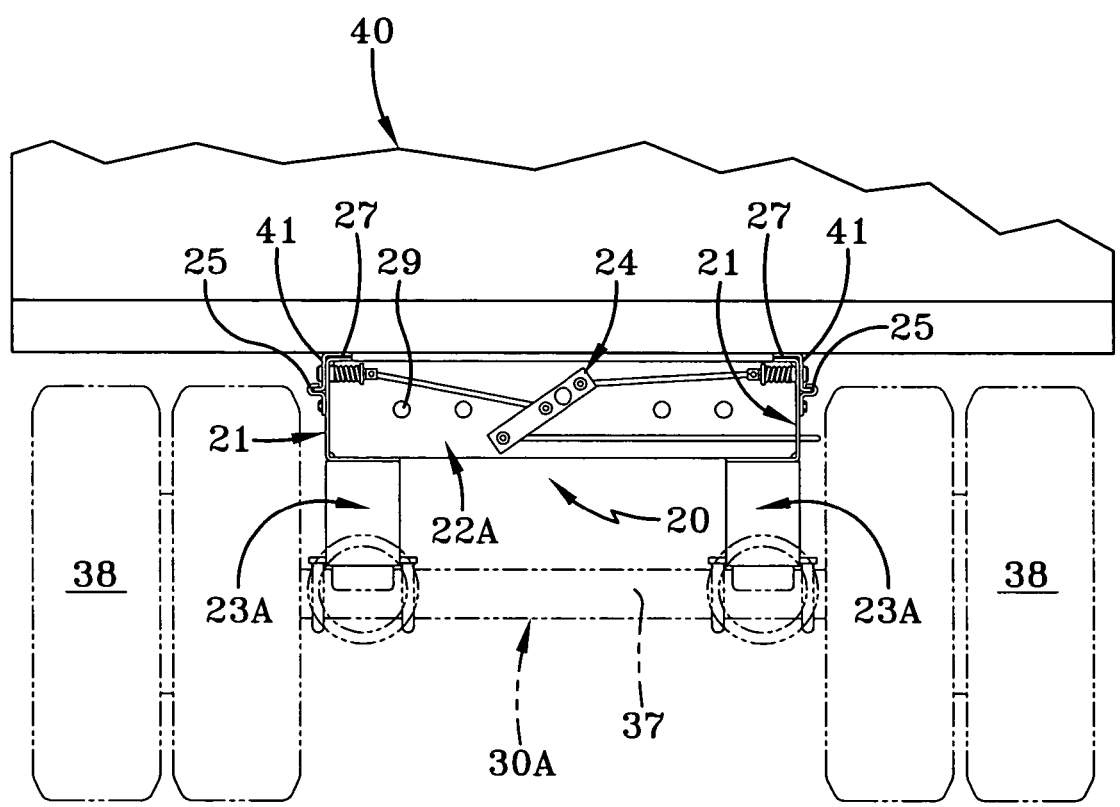
FIG. 5 is an enlarged fragmentary front end view of the mounted slider shown in FIG. 4.

Slider 20 is movably mounted on trailer body 40 (FIGS. 4–5) by slidable engagement of rail guides 25 with spaced apart, parallel and generally Z-shaped rails 41 which are mounted on and depend from the underside of the primary frame members (not shown) of the trailer body. Each low friction strip 27 abuts the bottom surface of the uppermost portion of a respective one of rails 41 to provide a smooth, generally friction-free contact surface for slidable movement of slider 20 on trailer body 40. Slider 20 is selectively positioned relative to trailer body 40 for optimum load distribution and trailer versatility by retractable pin mechanism 24 which engages selected ones of openings 53 formed in rails 41 in a manner well-known to those having ordinary skill in the trucking art.

Figure 6:
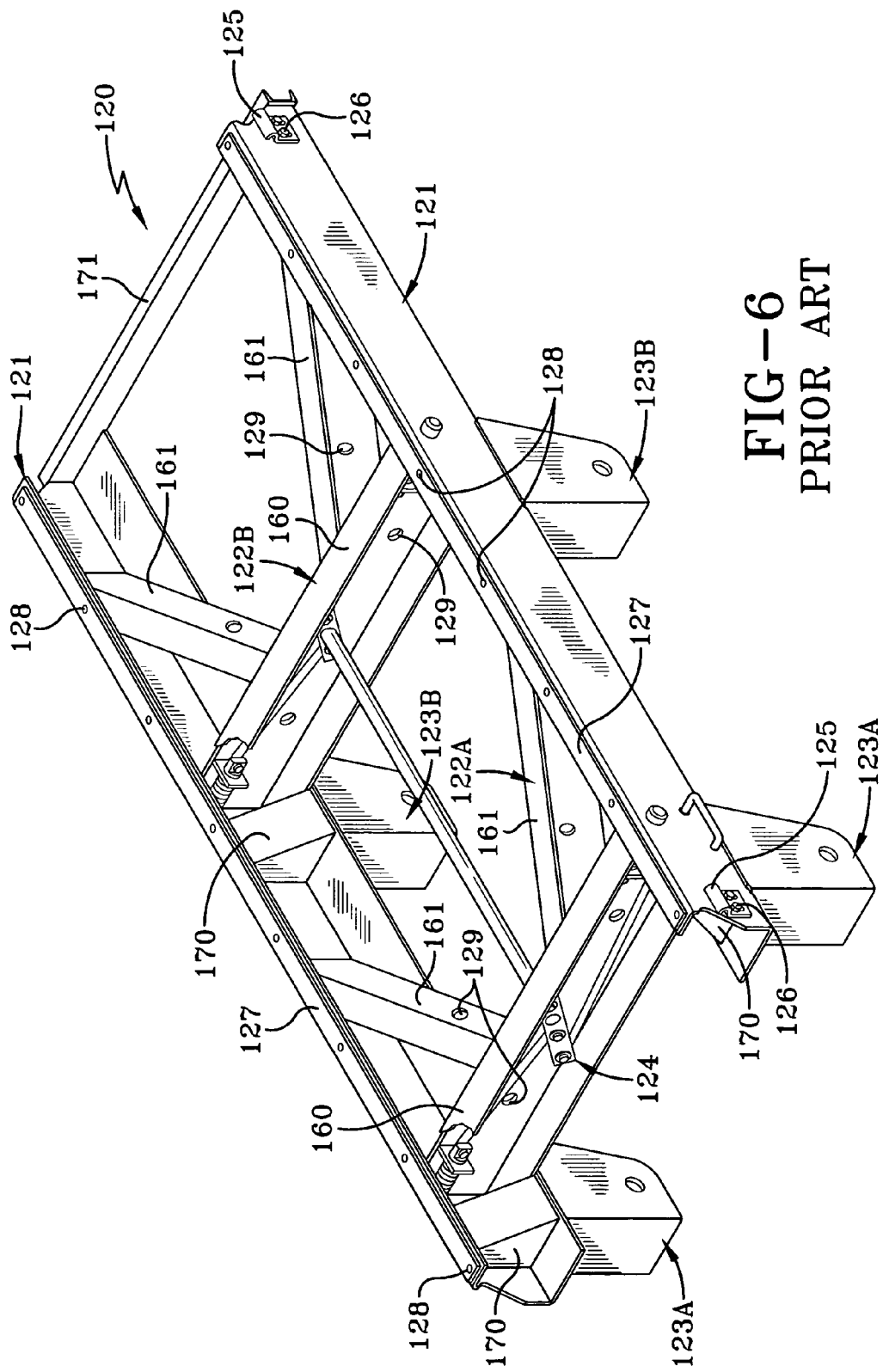
FIG. 6 is a perspective view of another prior art slider for semi-trailers having a pair of K-shaped cross member structures, showing the retractable pin mechanism used to selectively locate the slider along the underside of a trailer, and further showing depending hangers for suspending axle/suspension systems.

Another prior art semi-trailer slider is indicated generally at 120 and is shown in FIG. 6. Although prior art slider 120 is similar in many respects to prior art slider 20 described in detail hereinabove and shown in FIGS. 1–5, slider 120 is different than slider 20 in certain respects. Slider 120 is the subject of U.S. Pat. No. 5,720,489 referred to hereinabove. The structural differences between sliders 120 and 20 will be described in detail immediately below. Slider 120 includes a pair of main members 121, front and rear generally K-shaped cross member structures 122A and 122B, respectively, front and rear pairs of hangers 123A and 123B, respectively, for suspending axle/suspension systems, and a retractable pin mechanism 124.

Specifically, each main member 121 is an elongated generally C-shaped beam made of a metal such as steel or other suitable material, and the other components of slider 120, including hangers 123 and pin mechanism 124 are formed of a similar robust material unless otherwise noted. The open portion of each main member 121 is opposed to the open portion of the other main member and faces inboard relative to slider 120. Main members 121 are connected to each other in spaced-apart parallel relationship by K-shaped cross member structures 122A, B.

Each K-shaped cross member structure 122 includes a base member 160 which extends between and is perpendicular to main members 121. Each base member 160 is a generally C-shaped beam made of a metal such as steel or other suitable material. The open portion of each base member 160 faces in a frontward direction. Each end of base member 160 nests in the open portion of a respective one of main members 121, and is secured therein by any suitable means such as welding or mechanical fastening. Each front hanger 123A is attached, by welding or other suitable means, to the lowermost surface of a respective one of main members 121 at a location directly beneath base member 160 of front K-shaped cross member structure 122A. Each rear hanger 123B similarly is attached at a location directly beneath base member 160 of rear K-shaped cross member structure 122B. Each K-shaped cross member structure 122 further includes a pair of inclined members 161, each of which is a generally C-shaped beam also made of a metal such as steel or other suitable robust material. The open portion of each inclined member 161 faces in an outboard-frontward direction, and each of the inclined members extends between generally the middle portion of base member 160 and a respective one of main members 121. The front end of each inclined member 161 is attached to the rearwardmost surface of base member 160 at an angle by any suitable means such as welding or mechanical fastening, and the rear end of each of the inclined members is nested at an angle in the open portion of a respective one of main members 121, and also is attached thereto by any suitable manner such as welding or mechanical fastening. An optional reinforcement bar 171, which extends between the rearwardmost ends of main members 121, adds additional strength to the structure, and is attached thereto by any suitable means such as welding or mechanical fasteners. Thus, it can be seen that base member 160 and inclined members 161 form an integral K-shaped cross member structure 122 which interconnects and maintains main members 121 in a spaced-apart parallel relationship.

One or more openings 129 (FIG. 6) are formed in the vertically extending surface of each base member 160 and each inclined member 161, and each of openings 129 is aligned with the corresponding openings formed in the other members to provide for passage of air and/or fluid conduits, electrical lines, and the like used in the operation of the semi-trailer (not shown).

Each main member 121 has a pair of rail guides 125 mounted on its outboard surface by bolts 126. Each rail guide 125 is mounted adjacent to a respective one of the front and rear ends of main member 121. A low friction strip 127 is attached to the uppermost surface of each main member 121 by recessed fasteners 128, and extends generally the entire length of main member 121. Strip 127 is formed of any suitable low friction material, such as ultra-high molecular weight polyethylene.

Figure 7:
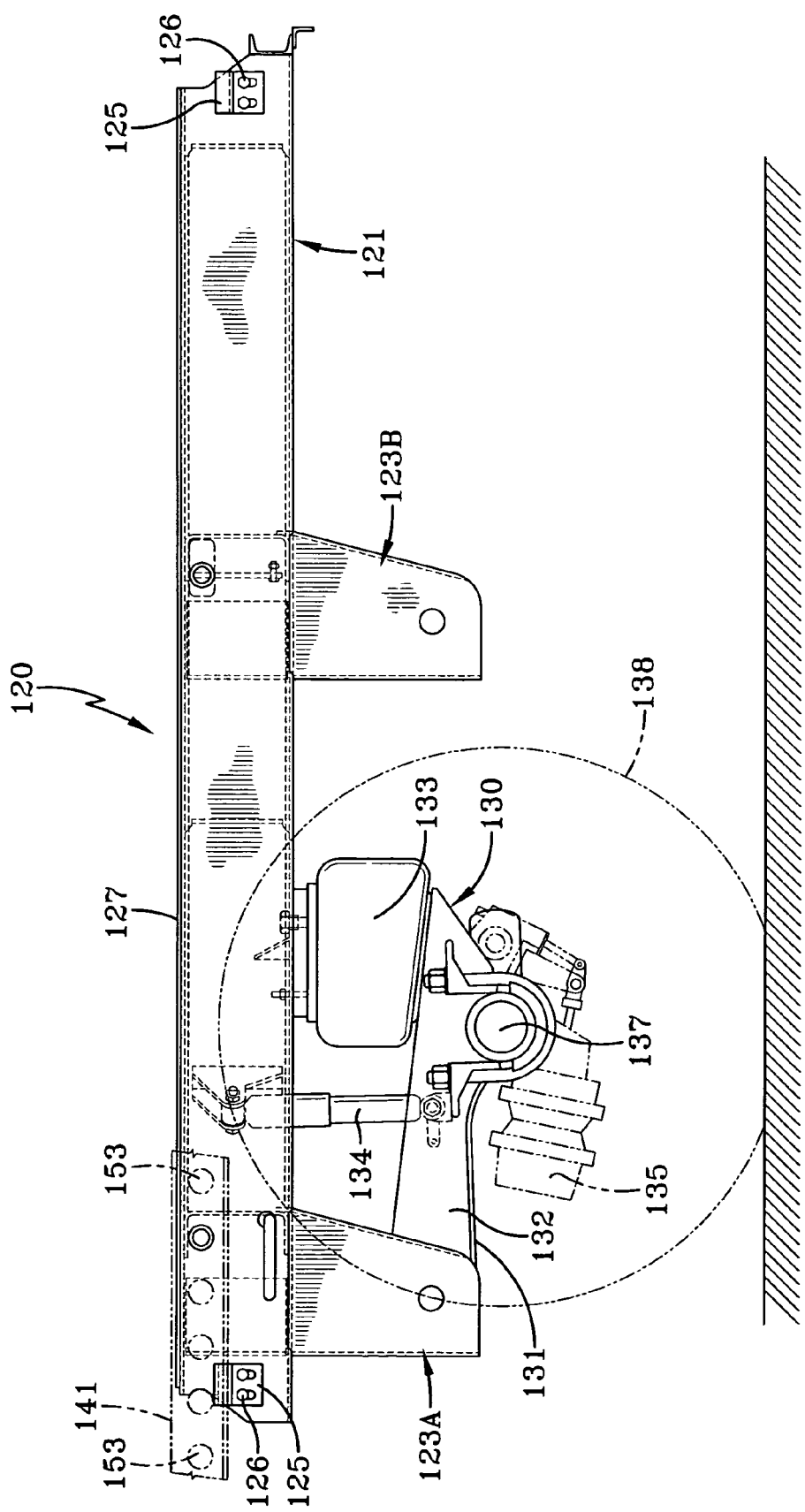
FIG. 7 is an enlarged fragmentary elevational view of the slider shown in FIG. 6, but showing one of the suspended axle/suspension systems, with a wheel/tire, portions of the suspension system, the cross member structures, and a trailer rail on which the slider is movably mounted, shown in broken lines.
Figure 8:
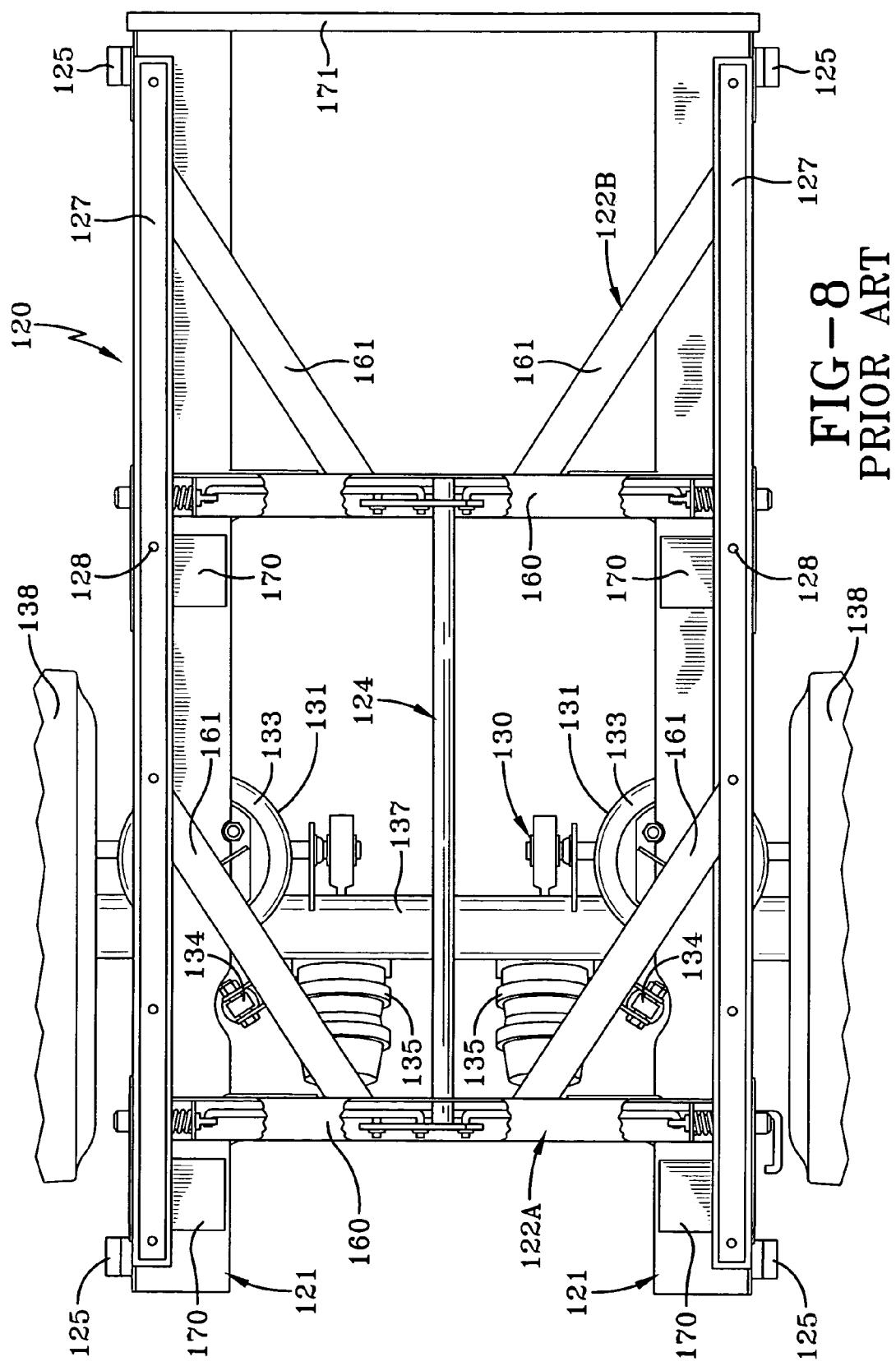
FIG. 8 is a fragmentary top plan view of the slider shown in FIG. 7.

As mentioned hereinabove, and as best shown in FIGS. 7 and 8, slider 120 supports front and rear axle/suspension systems. However, only front axle/suspension system 130 is shown in the drawings and described herein since the front and rear systems are identical in structure and operation. Moreover, inasmuch as axle/suspension system 130 is suspended from slider 120, but does not form an integral part thereof, only the major components of system 130 will be cited for aiding in the description of the environment in which slider 120 operates. Axle/suspension system 130 includes generally identical suspension assemblies 131 suspended from each hanger 123A of the pair of front hangers. A reinforcement box 170 is mounted by any suitable means in the open portion of each main member 121, frontward of and adjacent to each end of base member 160, to provide additional strength to slider 120 for supporting hangers 123A and their associated suspension assemblies 131. Each suspension assembly 131 includes a suspension beam 132 which is pivotally mounted on hanger 123A in a usual manner. An air spring 133 is suitably mounted on and extends between the upper surface of the rearwardmost end of suspension beam 132 and main member 121 at a location directly beneath the outboard end of a respective one of inclined members 161 of K-shaped cross member structure 122A. A shock absorber 134 extends between and is mounted on suspension beam 132 and the respective inclined member 161. Another component of suspension assembly 131, mentioned herein only for the sake of relative completeness, is an air brake 135. An axle 137 extends between and is captured in the pair of suspension beams 132 of axle/suspension system 130. One or more wheels/tires 138 are mounted on each end of axle 137.

Slider 120 is movably mounted on the trailer body (not shown) by slidable engagement of rail guides 125 with spaced apart, parallel and generally Z-shaped rails 141 (FIG. 7), which are mounted on and depend from the underside of the primary frame members (not shown) of the trailer body. Each low friction strip 127 abuts the bottom surface of the uppermost portion of a respective one of rails 141 to provide a smooth, generally friction-free contact surface for slidable movement of slider 120 on the trailer body. Slider 120 is selectively positioned relative to the trailer body for optimum load distribution and trailer versatility by retractable pin mechanism 124 which engages selected ones of openings 153 formed in rails 141 in a manner familiar to those having ordinary skill in the trucking art.

As discussed above, K-shaped cross member structure 122 of prior art slider 120 improved upon conventional cross members 22 of prior art slider designs such as slider 20. More particularly, prior art slider 120 utilizes a cross member structure and location for more efficiently withstanding combined vertical, lateral and longitudinal loading conditions experienced by the slider primarily during movement of the semi-trailer, yet reduces the overall weight of the slider from that of other prior art sliders by up to about fifteen percent. Specifically, sliders should be constructed so that they can withstand the various load conditions that a trailer will be subjected to during movement of the semi-trailer. Vehicles containing more than one non-steerable axle, such as semi-trailers, can be subjected to lateral or side loads directed through the slider hangers. Also, longitudinal loads can adversely affect a slider. In certain sharp turns known as drag turns, the front axle is dragged sideways in one direction, while the rear axle is dragged sideways in the opposite direction. The resulting twisting torsional action or racking effect of such lateral and/or longitudinal loads on a slider can be significant. However, in addition to the lateral and longitudinal loads, sliders must be capable of withstanding extreme vertical loads inputted through the suspension assemblies and hangers. Again, in prior art slider 20, cross members 22C and 22F are located directly above the site of the air spring attachments on main members 21 to provide support, and as discussed immediately above, cross members 22A, B, D and E provide support to hangers 23. Prior art slider 20 and similar designs attempt to control the adverse effect produced by vertical loads by using rigid, and therefore heavy, main members 21 and cross members 22. Although the heavy and rigid conventional cross member configuration optimizes the capability of prior art sliders to withstand vertical loads, the ability of such prior art slider designs to withstand lateral and longitudinal loads is less than optimum since the resulting racking effect on the rigid and heavy slider causes high stress at the joints of cross members 22 and main members 21, and ultimately reduces the life of the slider.

Prior art slider 120 has exhibited an improved ability to withstand lateral, longitudinal and vertical load conditions by utilizing the K-shaped cross member structures 122, and furthermore provides for significant weight and manufacturing cost savings over other prior art slider designs such as slider 20 due to a reduction in parts and associated labor required to assemble those parts. The cross members 22A–C and 22D–F of prior art slider 20 are replaced by K-shaped cross member structures 122A and 122B, respectively, to achieve such notable improvement covered in aforementioned U.S. Pat. No. 5,720,489. More particularly, and referring now only to front K-shaped cross member structure 122A since the structure and effect of rear structure 122B is virtually identical, a single base member 160 replaces two cross members 22A, B in supporting front hangers 123A against vertical loads. Inclined members 161, in combination with base member 160, provide lateral and longitudinal support to slider 120 by forming the K-shaped structure or brace 122A. Inclined members 161 also are positioned to provide vertical support for air springs 133. The result has been improved capability of prior art slider 120 to withstand the combined vertical, lateral and longitudinal loading conditions, while reducing the overall weight of the slider. Thus, prior art slider 120 has exhibited, relative to other prior art sliders such as slider 20, improved ability to withstand lateral and longitudinal loads such as may be produced when the semi-trailer performs split mu surface braking and drag turns, or encounters cornering impact with curbs and direct impact with potholes. However, room for improvement in the structure and function of slider 120 still has existed.

Figure 9:
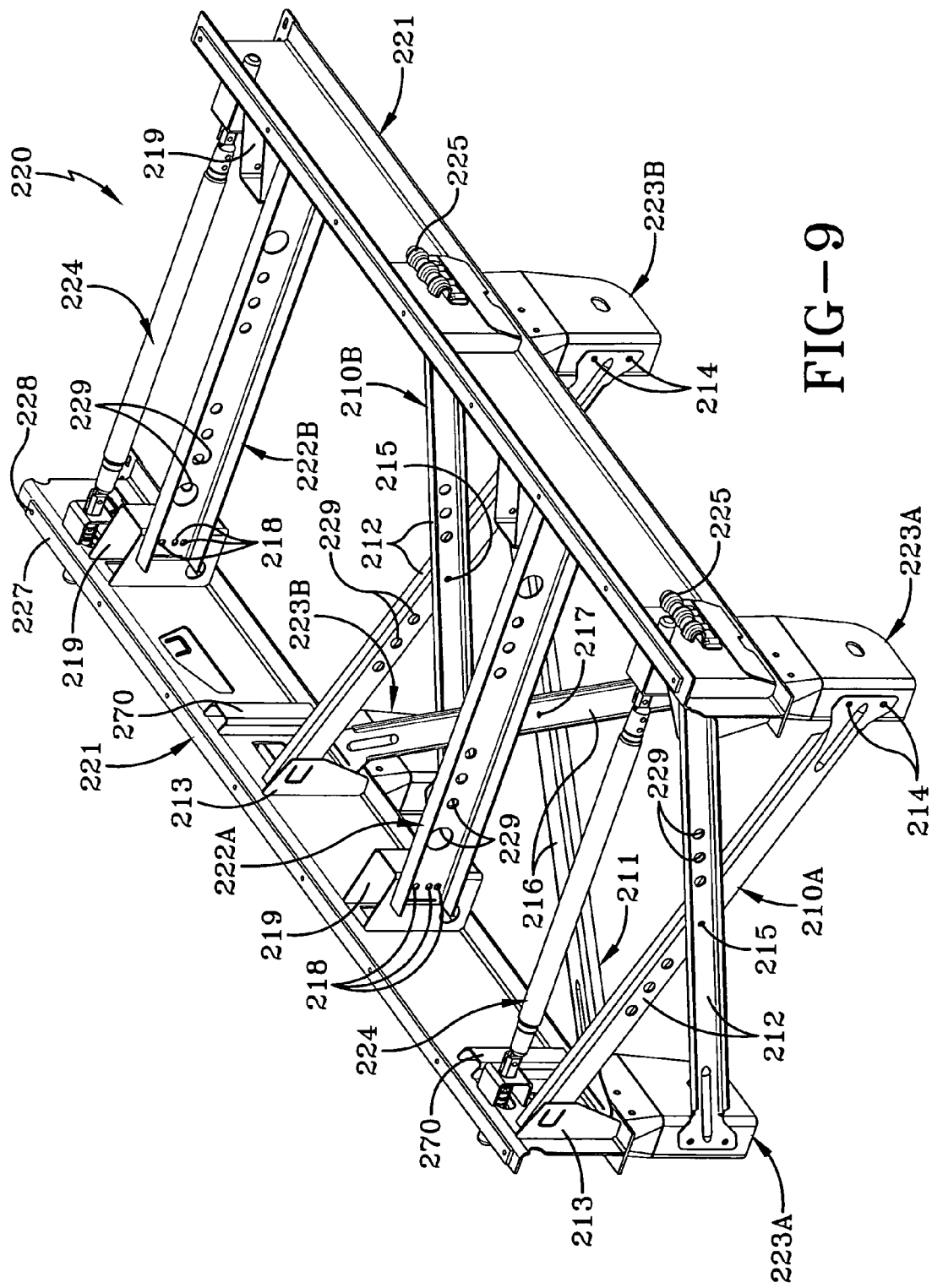
FIG. 9 is a perspective view of the cross-brace slider of the present invention, showing the retractable pin mechanism and the depending hangers.
Figure 10:
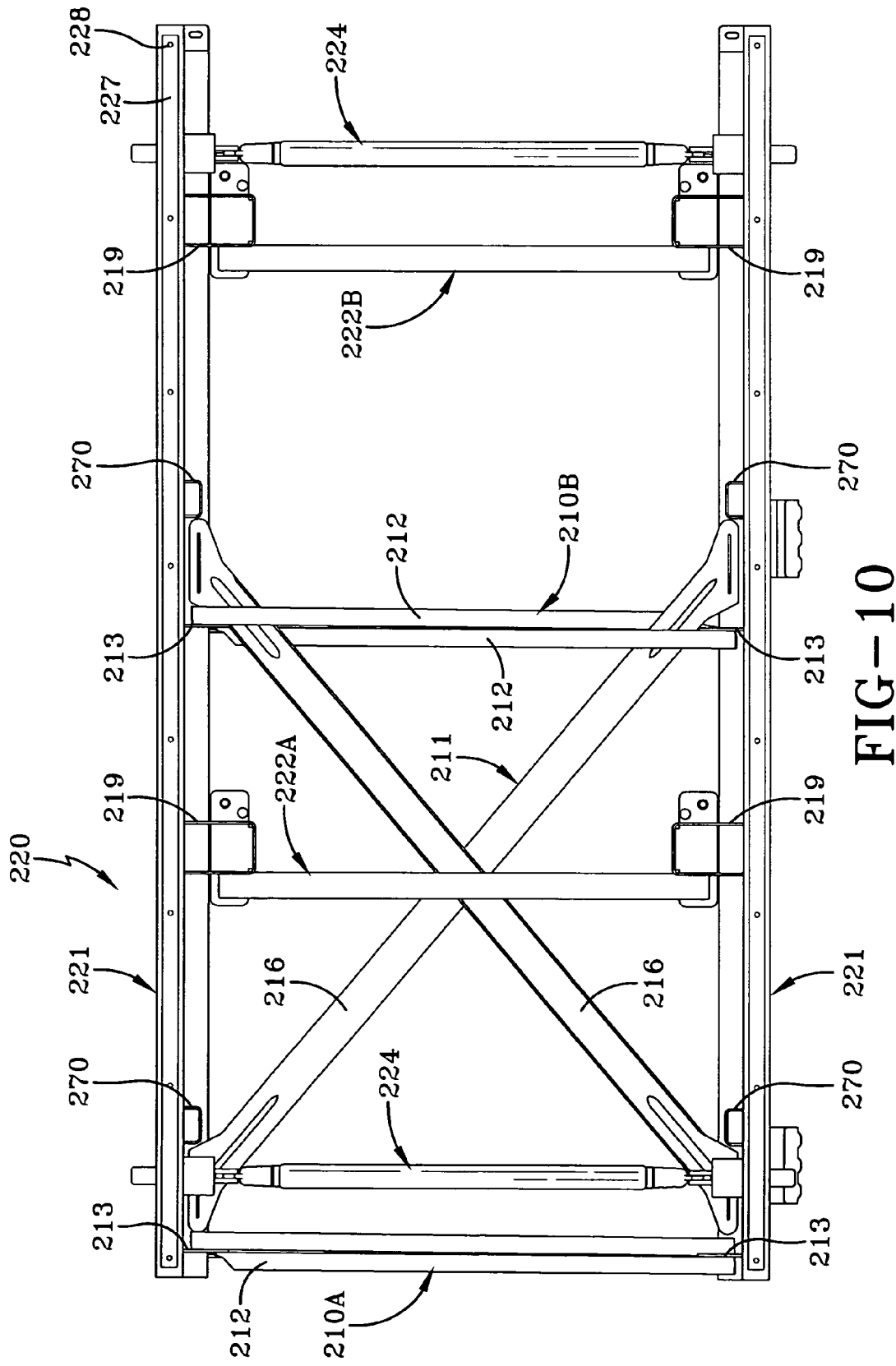
FIG. 10 is a top plan view of the slider shown in FIG. 9.
Figure 13:
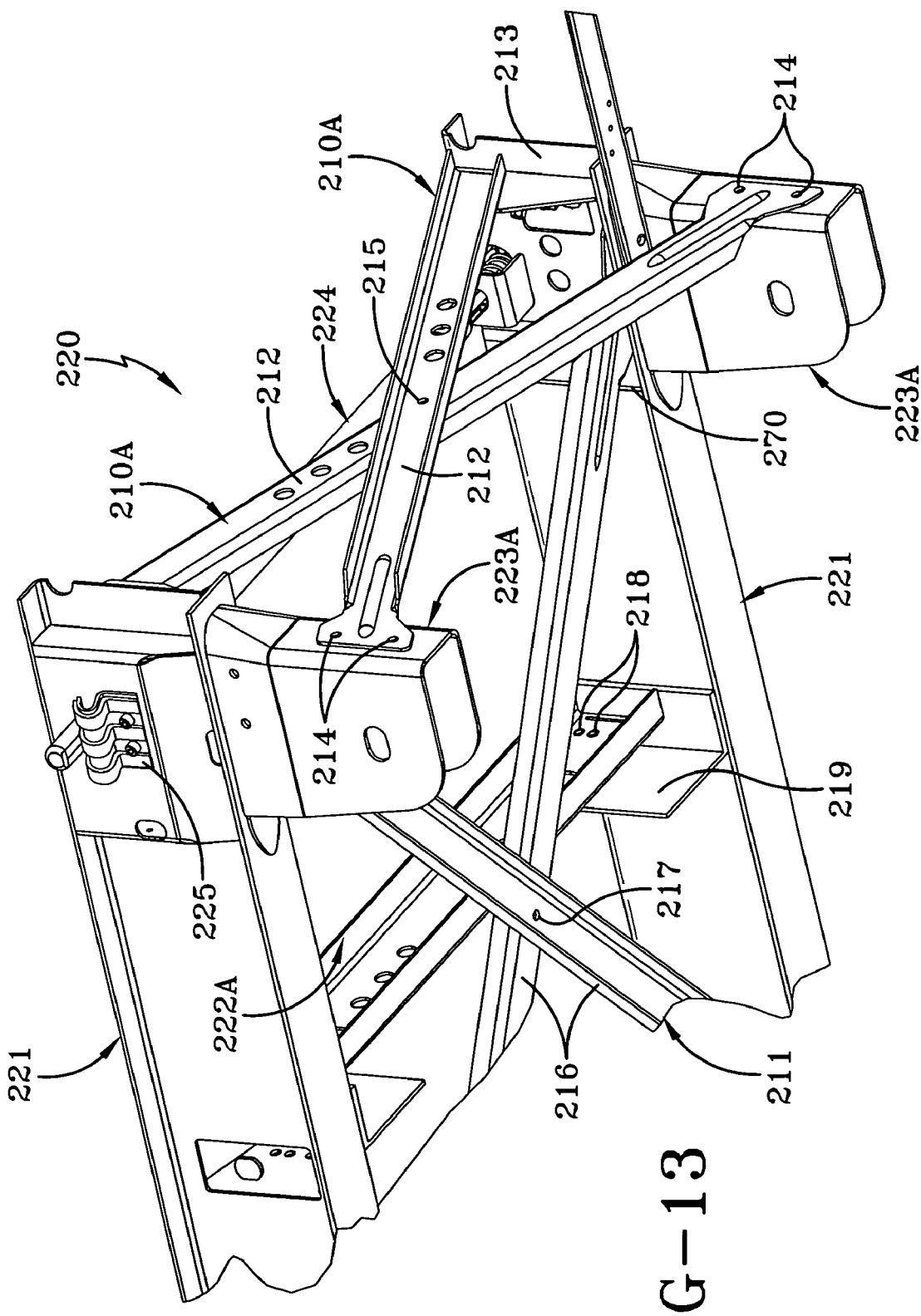
FIG. 13 is a fragmentary bottom front perspective view of the slider shown in FIG. 12.

The improved slider for semi-trailers of the present invention is indicated generally at 220 and is shown in FIG. 9, and is an improvement over prior art sliders 20 and 120. More specifically, although slider 220 of the present invention is similar in some respects to prior art sliders 20 and 120 described in detail hereinabove and shown in FIGS. 1–8, slider 220 is different than sliders 20 and 120 in certain respects, thereby contributing to the improved performance of the slider of the present invention over these and other similar prior art sliders. The structural and resulting performance differences between slider 220 of the present invention and prior art sliders 120 and 20 will be described in detail below. Slider 220 includes a pair of main members 221, front and rear cross members 222 A, B, respectively, front and rear vertical cross-brace structures 210A, B, respectively, a horizontal cross-brace structure 211, front and rear pairs of hangers 223A, B, respectively, for suspending axle/suspension systems, and a retractable pin mechanism 224.

Specifically, each main member 221 is an elongated J-beam made of a metal such as steel or other suitable material. Main members 221 are connected to each other in spaced-apart parallel relationship by front and rear cross members 222A, B and front and rear vertical cross-brace structures 210A, B, and horizontal cross-brace structure 211. Cross members 222A, B, and cross-brace structures 210 A, B and 211 are formed of a metal such as steel, aluminum or other suitable robust material, such as a composite material, an example of which is glass-reinforced polyethylene.

Each cross member 222 is a generally C-shaped beam having its open portion facing frontward. Each cross member 222 extends between and is attached at each of its ends, preferably by fasteners such as bolts 218, to a reinforcement bracket 219 which in turn is welded to its respective main member 221.

In accordance with one of the main features of the present invention, each cross-brace structure 210A, B includes a pair of generally transversely extending inclined members 212. Although inclined cross members 212 each also are formed of a sturdy material such as steel or other robust material, they are much lighter than either cross members 22 or diagonal members 161 of prior art slider structures 20, 120, respectively, described hereinabove. Each cross member 212 is generally C-shaped with the open portion of one of the cross members facing frontward, and the open portion of the other cross member facing rearward. Each cross member 212 extends between a respective one of main members 221 adjacent to pin mechanism 224 and hangers 223. More particularly, the upper or main member end of each inclined cross member 212 preferably is welded to an inboardly extending flange 213 which is in turn attached by welding to its respective main member 221. The lower or hanger end of each inclined cross member 212 is attached to a front surface of its respective hanger 223 via fasteners 214 such as bolts. Another fastener 215, preferably a bolt, extends through aligned openings (not shown) formed in a central portion of each cross member 212 and is secured thereto by a nut to interconnect the members for added structural integrity.

In accordance with another of the important features of the present invention, horizontal cross-brace structure 211 is formed by a pair of diagonally extending cross members 216. The ends of each cross member 216 each preferably are welded to respective ones of main members 221 adjacent to respective ones of hangers 223A, B, so that horizontal cross-brace structure 211 extends from the frontwardmost portion of slider 220 and rearward to the central portion of the slider. Diagonal cross members 216 similarly are fastened together where they intersect by a strut bolt 217 or a weld (not shown). Thus, it can be seen that cross members 222A, B and vertical and horizontal cross-brace structures 210A, B and 211, respectively, interconnect and maintain main members 221 in a spaced-apart parallel relationship. Each cross number 212, 222A, B has a plurality of openings formed in its vertically extending surface. Openings 229 are aligned with corresponding openings formed in the other cross members 212, 222A, B to provide for passage of air and/or fluid conduits, electrical lines, and the like used in the operation of the semi-trailer (not shown). Other advantages of vertical and horizontal cross-brace structures 210A, B and 211 over prior art cross members 22 or inclined members 161 of sliders 20 and 120, respectively, will be described in detail hereinbelow.

Each main member 221 has a pair of rail guides 225 mounted on its outboard surface by bolts 226 adjacent to respective ones of hangers 223A and B. A low-friction strip 227 is attached to the uppermost surface of each main member 221 by recessed fasteners 228, and extends generally the entire length of main member 221. Strip 227 is formed of any suitable low-friction material, such as ultra-high molecular weight polyethylene.

As mentioned hereinabove, and as best shown in FIG. 11, slider 220 of the present invention supports front and rear axle/suspension systems. However, only front axle/suspension system 230 is shown in the drawings and described herein since the front and rear systems are identical in structure and operation. Moreover, inasmuch as axle/suspension system 230 is suspended from slider 220, but does not form an integral part thereof, only the major components of system 230 will be cited for aiding in the description of the environment in which the slider of the present invention operates. Axle/suspension system 230 includes generally identical suspension assemblies 231 suspended from each hanger 223A of the pair of front hangers. A reinforcement box 270 is mounted by any suitable means on the inboard side of each main member 221, rearward of each of the ends of horizontal cross-brace structure 211, and adjacent to and above respective ones of hangers 223A, B, to provide additional strength to slider 220 for supporting hangers 223A, B and their associated suspension assemblies 231. Each suspension assembly 231 includes a suspension beam 232 which is pivotally mounted on hanger 223A in a usual manner. An air spring 233 is suitably mounted on and extends between the upper surface of the rearwardmost end of suspension beam 232, or an extension thereof, and main member 221 at a location directly beneath the outboard end of a respective one of cross members 222A, B. A shock absorber 234 extends between and is mounted on suspension beam 232 and the respective cross member 222A, B. Another component of suspension assembly 231, mentioned herein only for the sake of relative completeness, is an air brake 235. An axle 237 extends between and is captured in the pair of suspension beams 232 of axle/suspension system 230. One or more wheels (not shown) are mounted on each end of axle 237.

Slider 220 is movably mounted on the trailer body (not shown) by slidable engagement of rail guides 225 with spaced apart, parallel and generally Z-shaped rails which are mounted on and depend from the underside of the trailer body in a manner well-known to those skilled in the semi-trailer art. Each low-friction strip 227 abuts a respective one of the rails to provide a smooth, generally friction-free contact surface for slidable movement of slider 220 on the trailer body. Slider 220 is selectively positioned relative to the trailer body for optimum load distribution and trailer versatility by retractable pin mechanism 224 which engages selected ones of openings formed in the rails (not shown) in a manner familiar to those having ordinary skill in the trucking art and as shown and described hereinabove for prior art sliders 20, 120.

As discussed above, an important feature of the present invention is vertical and horizontal cross-brace structures 210A, B, 211 which replace and improve upon conventional cross members 22 and inclined members 161 of prior art slider designs. More particularly, slider 220 of the present invention optimizes cross member structure location for more efficiently reacting side or lateral loads, racking or twisting torsional loads, and fore-aft or longitudinal loading conditions experienced by the slider primarily during movement of the semi-trailer, yet reduces the overall weight of the slider from that of prior art sliders by up to about fifteen percent and provides an overall stronger and more efficient slider structure.

Specifically, and as noted hereinabove in the discussion of prior art slider 120, sliders should be constructed so that they can withstand the various load conditions that a trailer will be subjected to during movement of the semi-trailer. Vehicles containing more than one non-steerable axle, such as semi-trailers, are subject to lateral or side loads. Such lateral loads, in the case of drag turns, are directed through the slider hangers in opposite transverse directions. Also, longitudinal loads can adversely affect sliders 20 and 120. The torsional or racking effect of such lateral and/or longitudinal loads on sliders 20, 120 can be significant, although less significant in slider 120 which heretofore has been considered the state-of-the-art slider, than in conventional prior art slider 20. However, in addition to the side or lateral and fore-aft or longitudinal loads, sliders must be capable of withstanding extreme vertical loads inputted through the suspension assemblies and hangers. Again, cross members 22C and 22F in prior art slider 20 are located directly above the site of the air spring attachments on main members 21 to provide support, and as discussed immediately above, cross members 22A, B, D, and E provide support to the hangers. Prior art slider 20 and similar designs attempt to control the adverse affect produced by vertical loads by using rigid, and therefore heavy, main members 21 and cross members 22. Although the heavy and rigid conventional cross member configuration optimizes the capability of prior art sliders such as slider 20 to withstand vertical loads, the ability of such prior art slider designs to withstand lateral and longitudinal loads is less than optimum since the resulting racking effect on the rigid and heavy slider causes high stress at the joints of cross members 22 and main members 21, and ultimately reduces the life of the slider.

Although slider 120 employing K-shaped cross-member structures 122 was an improvement and resulted in significant weight and manufacturing cost savings over prior art slider 20 due to a reduction in parts and associated labor required to assemble those parts and satisfactorily performed its intended function, the present invention is more robust and more efficiently controls certain twisting deflections. Moreover, the present invention more efficiently reacts other loadings. For example, as loads are encountered by suspension assemblies 231 of a semi-trailer during operation, improved slider 220 of the present invention is subjected to concentrated loads which pass through suspension assemblies 231 of the vehicle during operation, and the slider efficiently reacts or dissipates such concentrated loads throughout the entire slider structure. In particular, the combination of vertical and horizontal cross-brace structures 210A, B, and 211, respectively, enables dissipation of loads into the entire slider structure adjacent to front and rear hangers 223A, 223B, respectively, rather than in a more limited area adjacent to each hanger as in prior art sliders 20, 120. For example, as a lateral load from one side of slider 220 pushes a force through certain ones of cross members 212 and 216 of vertical and horizontal cross-brace structures 210A, B, and 211, respectively, other ones of cross members 212 and 216 pull the forces through the slider structure. Specifically, vertical cross-brace structures 210A, B more efficiently react side loads allowing elimination of traditional hanger cross members and hanger diagonal bracing, thus reducing weight and cost yet at the same time increasing durability. The horizontal cross-brace structure 211 also more efficiently reacts torsional twisting or racking loads, side loads, roll loads and fore-aft loads. This reduces the deflections of main rails 221 and all components attached to the main rails, such as frame hangers 223 and suspension assemblies 231, thus providing for a stronger and lighter design. Also, vertical cross-brace structures 210A, B and horizontal cross-brace structures 211 combine and cooperate to share and thus more efficiently react side loads and fore-aft loads, likewise reducing the deflections of the main rails and all components attached to the main rails, thus also adding to the strength of the slider in a lightweight and less costly design package.

Slider 220 of the present invention accomplishes the above-described improved results due to efficiently locating the new vertical and horizontal cross-brace structures 210A, B, and 211, respectively, in locations where the load vectors from the side loads and the racking loads occur. Prior art sliders 20, 120, in comparison and contrast, in many instances locate their cross members 22 or K-frame structures 122 away from these load vectors so that unwanted deflections and stress risers are much more prevalent. For example, K-shaped cross member structures 122 are not activated by lateral loads and thus do not dissipate those loads.

The cross-brace slider 220 of the present invention results in less cost in the manufacturing process, faster assembly times, and a stronger and lighter slider than prior art sliders. It is understood that other embodiments of cross-brace slider 220 could be manufactured solely with horizontal cross-brace structure 211, or only with one or more vertical cross-brace structures 210A, B, and with varying numbers of cross members 222, and still exhibit advantages over prior art sliders 20, 120. However, the preferred embodiment of the present invention is to utilize both vertical and horizontal cross-brace structures 210A, B and 211, respectively, with a pair of cross members 222. It is further understood that means other than rail guides 225 can be utilized for movably engaging the trailer rails. Similarly, it is further understood that means other than the retractable pin mechanism 224 shown and described herein can be utilized in connection with the present invention for selectively positioning the movable subframe of the present invention relative to the trailer. Moreover, cross-brace structures 210A, B, 211 can have configurations other than a cross or "X", such as an integral one-piece rectangular plate shape, without affecting the overall concept of the present invention. It should be noted that the present invention also contemplates the use of the inventive concepts of the movable slider or secondary frame structure on stationary primary frame structures, having two or more axles, of certain types of heavy-duty vehicle trailers, for example, flatbed trailers and some tanker trailers. It further contemplates application of the inventive concepts described hereinabove on non-movable subframes of the type found on grain trailers.

Accordingly, the improved slider for semi-trailers is simplified, provides an effective, safe, inexpensive, and efficient structure which achieves all the enumerated objectives, provides for eliminating difficulties encountered with prior semi-trailer sliders, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved trailer slider is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A subframe for a vehicle trailer, said subframe including:
   a) a pair of spaced-apart, parallel, elongated and longitudinally extending main members;
   b) a pair of hangers, each one of said hangers being attached to and depending below a lowermost surface of a respective one of said main members;
   c) at least one transverse cross member extending perpendicularly between and being attached to said main members; and
   d) a vertically disposed brace structure extending between and being attached to said main members and to said pair of hangers, said attachment of said brace structure to the hangers being located below said lowermost surface of said main members, for bracing said subframe.

2. The subframe of claim 1, in which at least one horizontally disposed brace structure extends between and is attached to said main members.

3. The subframe of claim 2, in which said horizontally disposed brace structure includes a generally cross or X shape.

4. The subframe of claim 1, in which said subframe includes two pairs of said hangers; in which one of the hanger pairs is longitudinally spaced from the other one of said hanger pairs; in which said subframe includes a pair of said vertically disposed brace structures; in which one of said pair of vertically disposed brace structures is longitudinally spaced from the other one of said pair of vertically disposed brace structures; in which each one of said pair of vertically disposed brace structures extends between and is attached to said main members and a respective pair of said pairs of hangers; in which each one of said vertically disposed brace structures includes a pair of diagonal cross members; in which each one of said diagonal cross members extends between and is mounted on respective ones of said main members and said hangers; in which said subframe includes a pair of said cross members; and in which said cross members are longitudinally spaced.

5. The subframe of claim 3, in which a reinforcement box is attached to each of said main members adjacent to and rearwardly of each of the ends of each one of a pair of diagonal cross members of said horizontally disposed cross-brace structure; and in which each of the ends of each of said horizontal diagonal cross members is mounted on said main members adjacent to respective ones of said hangers.

6. The subframe of claim 2, in which a reinforcement bracket is attached to each of said main members adjacent to each end of said transverse cross member; and in which each end of the transverse cross member is attached to a respective one of said reinforcement brackets.

7. The subframe of claim 6, in which said axle/suspension system is mounted on said pair of hangers; and in which an air spring of said axle/suspension system is mounted on and depends from each of said main members adjacent to a respective one of the ends of said transverse cross members.

8. The subframe of claim 7, in which an upper end of each one of a pair of shock absorbers of said axle/suspension system is attached to said transverse cross members.

9. The subframe of claim 1, in which said subframe is movably mounted on spaced-apart, parallel elongated rails mounted on the bottom of said trailer; in which said main members each include means for movably engaging a selected one of said trailer rails; and in which said subframe includes means for selectively positioning the subframe relative to a trailer frame for facilitating load distribution.

10. The subframe of claim 9, in which said means for movably engaging respective ones of said trailer rails is a pair of spaced-apart rail guides mounted on an outboard surface of each of said main members; in which said rail guides slidably engage said trailer rails; and in which a low-friction material is mounted on generally the entire uppermost surface of each of said main members to facilitate slidable movement of said subframe on said trailer rails.

11. The subframe of claim 9, in which said means for selectively positioning said subframe relative to said trailer is a retractable pin mechanism.

12. The subframe of claim 9, in which said subframe is formed of steel.

13. The subframe of claim 1, in which said vertically disposed brace structure includes a generally cross or X shape.

14. The subframe of claim 13, in which a pair of said vertically disposed brace structures extend between and are attached to said main members and said hangers; in which each one of said vertically disposed brace structures includes a pair of diagonal cross members; and in which each of said diagonal cross members extends between and is mounted on respective ones of said main members and said hangers.

15. A subframe for a vehicle trailer; said subframe including:
   a) a pair of spaced-apart, parallel, elongated and longitudinally extending main members;
   b) a pair of spaced-apart, parallel, transverse cross members extending between and being attached to said main members;
   c) a horizontally disposed brace structure having a generally cross or X shape and extending between and being attached to said main members; and
   d) at least one vertically disposed brace structure having a generally cross or X shape and extending between and being attached to said main members and to a pair of hangers, each one of said hangers being attached to and depending below a lowermost surface of a respective one of the main members, said attachment of said vertically disposed brace structure to said hangers being located below said lowermost surface of said main members, whereby said subframe is braced.

16. A subframe for a vehicle trailer, said subframe including:
   a) a pair of spaced-apart, parallel, elongated and longitudinally extending main members;
   b) a pair of spaced-apart, parallel, transverse cross members extending between and being attached to said main members;
   c) a horizontally disposed brace structure having a generally cross or X shape and extending between and being attached to said main members; and
   d) a pair of vertically disposed brace structures each having a generally cross or X shape, and extending between and being attached to said main members and to a respective pair of pair of hangers, each one of said hangers being attached to and depending below a lowermost surface of a respective one of the main members, each one of said vertically disposed brace structures including a pair of diagonal cross members extending between and being attached to respective ones of said main members and a respective pair of said pairs of hangers, said attachment of said vertically disposed brace structure to said hangers being located below said lowermost surface of said main members, whereby said subframe is braced.

17. A flame structure for a vehicle trailer; said frame structure including:
   a) a pair of spaced-apart, parallel elongated and longitudinally extending main members;
   b) a pair of spaced-apart, parallel transverse cross members extending between and being attached to said main members;
   c) a horizontally disposed brace structure having a generally cross or X shape and extending between and being attached to said main members;
   d) at least one vertically disposed brace structure having a generally cross or X shape and extending between and being attached to said main members and to a pair of hangers which are attached to and depend from the main members; and
   e) a reinforcement box attached to each of said main members adjacent to and rearwardly of each of the ends of each one of a pair of diagonal cross members of said horizontally disposed cross-brace structure, wherein each of the ends of each of said horizontal diagonal cross members is mounted on said main members adjacent to respective ones of said hangers.

* * * * *

UNITED STATES PATENT AND TRADEMARK OFFICE
CERTIFICATE OF CORRECTION

| | |
|---|---|
| PATENT NO. | : 7,198,298 B2 |
| APPLICATION NO. | : 10/686169 |
| DATED | : April 3, 2007 |
| INVENTOR(S) | : John Edward Ramsey |

It is certified that error appears in the above-identified patent and that said Letters Patent is hereby corrected as shown below:

Col. 12, Claim 7, Line 57, "members" should be changed to --member--.

Col. 12, Claim 8, Line 60, "members" should be changed to --member--.

Col. 14, Claim 16, Line 10, "pair of pair" should be changed to --pair of pairs--.

Col. 14, Claim 17, Line 21, "A flame structure" should be changed to --A frame structure--.

Signed and Sealed this

Fifteenth Day of May, 2007

JON W. DUDAS
*Director of the United States Patent and Trademark Office*